(12) United States Patent
Grayson et al.

(10) Patent No.: US 10,067,265 B2
(45) Date of Patent: Sep. 4, 2018

(54) SEMI-TRANSPARENT REFLECTORS

(75) Inventors: Benjamin Alan Grayson, Ann Arbor, MI (US); Debasish Banerjee, Ann Arbor, MI (US); Masahiko Ishii, Okazaki (JP)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 841 days.

(21) Appl. No.: 12/902,763

(22) Filed: Oct. 12, 2010

(65) Prior Publication Data

US 2012/0087009 A1 Apr. 12, 2012

(51) Int. Cl.
| | | |
|---|---|---|
| G02B 5/10 | (2006.01) | |
| G02B 1/00 | (2006.01) | |
| G02B 5/08 | (2006.01) | |
| G02B 1/10 | (2015.01) | |

(52) U.S. Cl.
CPC ............. *G02B 1/005* (2013.01); *G02B 1/10* (2013.01); *G02B 5/0825* (2013.01); *G02B 5/0833* (2013.01)

(58) Field of Classification Search
USPC .................. 359/584, 586, 839, 588; 428/403
See application file for complete search history.

(56) References Cited

U.S. PATENT DOCUMENTS

| | | |
|---|---|---|
| 3,247,392 A | 4/1966 | Thelen |
| 3,769,515 A | 10/1973 | Clark, Jr. |
| 3,885,408 A | 5/1975 | Clark, Jr. |
| 3,910,681 A | 10/1975 | Elliott et al. |
| 4,079,605 A | 3/1978 | Bartels |

(Continued)

FOREIGN PATENT DOCUMENTS

| | | |
|---|---|---|
| EP | 1162495 | 12/2001 |
| EP | 1286184 | 2/2003 |

(Continued)

OTHER PUBLICATIONS

Laser 2000 Gmbttp://www.laser2000.de/fileadmin/Produkdaten/SK_WEB/Datenblaetter_SEM/SEMROCK-StopLine-Notchfilter.pdf, accessed Feb. 2, 2010.

(Continued)

*Primary Examiner* — Audrey Y Chang
(74) *Attorney, Agent, or Firm* — Dinsmore & Shohl LLP (57) ABSTRACT

In one embodiment, a semi-transparent reflector may include a multilayered photonic structure. The multilayered photonic structure includes a plurality of coating layers of high index dielectric material and a plurality of coating layers of low index dielectric material. The plurality of coating layers of high index dielectric material and the plurality of coating layers of low index dielectric material of the multilayered photonic structure are arranged in an $[LH \ldots (LH)^N \ldots L]$ structure. L is one of the plurality of coating layers of low index dielectric material. H is one of the plurality of coating layers of high index dielectric material. N is a positive integer. The multilayered photonic structure has substantially constant reflectance values for wavelengths of electromagnetic radiation in a visible spectrum over a range of angles of incidence of the electromagnetic radiation.

17 Claims, 8 Drawing Sheets

(56) References Cited

U.S. PATENT DOCUMENTS

| | | |
|---|---|---|
| 4,449,126 A | 5/1984 | Pekker |
| 4,525,023 A | 6/1985 | Dorschner |
| 4,556,599 A | 12/1985 | Sato et al. |
| 4,643,518 A | 2/1987 | Taniguchi |
| 4,673,914 A | 6/1987 | Lee |
| 4,714,308 A | 12/1987 | Sawamura et al. |
| 4,868,559 A | 9/1989 | Pinnow |
| 5,007,710 A | 4/1991 | Nakajima et al. |
| 5,043,593 A | 8/1991 | Tsutsumi et al. |
| 5,132,661 A | 7/1992 | Pinnow |
| 5,138,468 A | 8/1992 | Barbanell |
| 5,245,329 A | 9/1993 | Gokcebay |
| 5,279,657 A | 1/1994 | Phillips et al. |
| 5,283,431 A | 2/1994 | Rhine |
| 5,323,416 A | 6/1994 | Bhat et al. |
| 5,491,470 A | 2/1996 | Valigdan |
| 5,543,665 A | 8/1996 | Demarco |
| 5,561,420 A | 10/1996 | Kleefeldt et al. |
| 5,571,624 A * | 11/1996 | Phillips et al. ............... 428/403 |
| 5,653,792 A | 8/1997 | Phillips et al. |
| 5,691,844 A | 11/1997 | Oguchi et al. |
| 5,850,309 A | 12/1998 | Shirai et al. |
| 5,889,603 A | 3/1999 | Roddy et al. |
| 6,049,419 A | 4/2000 | Wheatley et al. |
| 6,055,079 A | 4/2000 | Hagans et al. |
| 6,130,780 A | 10/2000 | Joannopoulos et al. |
| 6,156,115 A | 12/2000 | Plaff et al. |
| 6,180,025 B1 | 1/2001 | Schoenfeld et al. |
| 6,331,914 B1 * | 12/2001 | Wood et al. ................... 359/584 |
| 6,387,457 B1 | 5/2002 | Jiang et al. |
| 6,399,228 B1 | 6/2002 | Simpson |
| 6,433,931 B1 | 8/2002 | Fink et al. |
| 6,534,903 B1 * | 3/2003 | Spiro et al. ................... 313/113 |
| 6,565,770 B1 | 5/2003 | Mayer et al. |
| 6,574,383 B1 | 6/2003 | Erchak et al. |
| 6,618,149 B1 | 9/2003 | Stirton |
| 6,624,945 B2 * | 9/2003 | Fan et al. ...................... 359/584 |
| 6,641,874 B2 | 11/2003 | Kuntz et al. |
| 6,667,095 B2 | 12/2003 | Wheatley et al. |
| 6,873,393 B2 | 3/2005 | Ma |
| 6,887,526 B1 | 5/2005 | Arit et al. |
| 6,894,838 B2 * | 5/2005 | Mizrahi et al. ............... 359/584 |
| 6,903,873 B1 | 6/2005 | Joannopoulos et al. |
| 6,927,900 B2 | 8/2005 | Liu et al. |
| 6,997,981 B1 | 2/2006 | Coombs et al. |
| 7,098,257 B2 | 8/2006 | Rink et al. |
| 7,123,416 B1 | 10/2006 | Erdogan et al. |
| 7,141,297 B2 | 11/2006 | Condo et al. |
| 7,184,133 B2 | 2/2007 | Coombs et al. |
| 7,190,524 B2 | 3/2007 | Grawert et al. |
| 7,215,473 B2 | 5/2007 | Fleming |
| 7,267,386 B2 | 9/2007 | Hesch |
| 7,367,691 B2 | 5/2008 | Lin |
| 7,410,685 B2 | 8/2008 | Rosenberger et al. |
| 7,446,142 B2 | 11/2008 | Meisenburg et al. |
| 7,483,212 B2 | 1/2009 | Cho et al. |
| 7,903,339 B2 | 3/2011 | Banerjee et al. |
| 7,980,711 B2 * | 7/2011 | Takayanagi et al. ......... 359/839 |
| 8,203,787 B2 | 6/2012 | Atsuta et al. |
| 8,380,251 B2 * | 2/2013 | Witkowski et al. .......... 455/563 |
| 2001/0022151 A1 | 9/2001 | Silwinski et al. |
| 2002/0129739 A1 | 9/2002 | Yanagimoto et al. |
| 2003/0059549 A1 | 3/2003 | Morrow et al. |
| 2004/0047055 A1 | 3/2004 | Mizrahi et al. |
| 2004/0156984 A1 | 8/2004 | Vitt et al. |
| 2004/0179267 A1 | 9/2004 | Moon et al. |
| 2004/0246477 A1 | 12/2004 | Moon et al. |
| 2004/0263983 A1 | 12/2004 | Acree |
| 2004/0265477 A1 | 12/2004 | Nabatova-Gabain et al. |
| 2005/0126441 A1 | 6/2005 | Skelhorn |
| 2005/0235714 A1 | 10/2005 | Lindstrom |
| 2006/0030656 A1 | 2/2006 | Tarng et al. |
| 2006/0081858 A1 | 4/2006 | Lin et al. |
| 2006/0159922 A1 | 7/2006 | O'Keefe |
| 2006/0222592 A1 | 10/2006 | Burda |
| 2007/0221097 A1 | 9/2007 | Tarng et al. |
| 2008/0013178 A1 | 1/2008 | Terada |
| 2009/0046368 A1 * | 2/2009 | Banerjee et al. ............. 359/584 |
| 2009/0082659 A1 | 3/2009 | Ham et al. |
| 2009/0153953 A1 | 6/2009 | Banerjee et al. |
| 2009/0303044 A1 | 12/2009 | Furuichi et al. |
| 2010/0208338 A1 | 8/2010 | Banerjee et al. |
| 2010/0209593 A1 | 8/2010 | Banerjee et al. |
| 2010/0213485 A1 | 8/2010 | McKenzie et al. |

FOREIGN PATENT DOCUMENTS

| | | |
|---|---|---|
| JP | S58202408 A | 11/1983 |
| JP | S61243402 | 10/1986 |
| JP | S63074005 | 2/1989 |
| JP | 2000049522 A | 2/2000 |
| JP | 2000329933 | 11/2000 |
| JP | 3120518 | 12/2000 |
| JP | 2001215608 | 8/2001 |
| JP | 2001249221 | 9/2001 |
| JP | 2001315243 A | 11/2001 |
| JP | 2002504711 A | 2/2002 |
| JP | 2002182020 | 6/2002 |
| JP | 2002187492 | 7/2002 |
| JP | 2002537173 | 11/2002 |
| JP | 2003179419 | 6/2003 |
| JP | 2004020525 | 1/2004 |
| JP | 2004133004 A | 4/2004 |
| JP | 2004035941 | 5/2004 |
| JP | 2004309322 | 11/2004 |
| JP | 2005144925 | 6/2005 |
| JP | 2006097426 | 4/2006 |
| JP | 2007065232 A | 3/2007 |
| JP | 2007113091 A | 5/2007 |
| JP | 2008015240 A | 1/2008 |
| JP | 2008038382 | 2/2008 |
| JP | 2000220331 | 8/2008 |
| JP | 2009180166 A | 8/2009 |
| JP | 2009192708 | 8/2009 |
| JP | 2009198192 | 9/2009 |
| JP | 20100526318 | 7/2010 |
| JP | 20100191431 | 9/2010 |
| WO | WO02054030 | 7/2002 |
| WO | WO03062871 | 7/2003 |

OTHER PUBLICATIONS

International Search Report for PCT/US2010/022378 mailed Mar. 30, 2010.

Hongqiang et al., "Disordered Dielectric High Reflectors With Broadband From Visible to Infrared," Applied Physics Letters, American Institute of Physics, Melville, NY, US. vol. 74, No. 22, dated May 31, 2009.

Xifre-Perez et al, "Porous Silicon Mirrors With Enlarged Omnidirectional Band Gap," Journal of Applied Physics, American Institute of Physics, Melville, NY, US, vol. 97, No. 6, dated Mar. 9, 2005.

Bendiganavale A.K., Malshe V.C., "Infrared Reflective Inorganic Pigments", Recent Patents on Chemical Engineering, 2008, 1, 67-79.

D.P. Young, Jr., et al. "Comparison of Avian Responses to UV-Light-Reflective Paint on Wind Turbines", National Renewable Energy Laboratory, Subcontract Report, Jan. 2003.

Maier, E.J. "To Deal With the Invisible: On the biological significance of ultraviolet sensitivity in birds." Naturwissenschaften 80: 476-478, 1993.

Nison, J., "Twinkle, Twinkle Little Star," Asia Pacific Coating Journal, Feb. 2004.

Fink. Joel., "A Dielectric Omnidirectional Reflector," E.L. Thomas, Science, vol. 282, Nov. 27, 1998.

Lin, Weihua, "Design and Fabrication of Omnidirectional Reflectors in the Visible Range" Journal of Modern Optics, vol. 52, No. 8, 1155 (2005).

Chen, Kevin M., "SiO2/TiO2 Omnidirectional Reflector and Microcavity Resonator via the Sol-Gel Method", Appl. Phys. Lett., vol. 75, No. 24, Dec. 13, 1999.

(56) References Cited

OTHER PUBLICATIONS

Almeida, R.M., "Photonic Bandgap Materials and Structures by Sol-Gel Processing", Journal of Non-Crystalline Solids, 405-499 (2003).
Deopura, M., "Dielectric Omnidirectional Visible Reflector," Optics Letters, Aug. 1, 2001, vol. 16, No. 15.
Decorby, R.G., "Planar Omnidirectional Reflectors in Chalcogenide Glass and Polymer" Optics Express, 6228, Aug. 8, 2005.
Clement, T.J., "Improved Omnidirectional Reflectors in Chalcogenide Glass and Polymer by Using the Silver Doping Technique", Optics Express, 14, 1789 (2006).
Bryant, A.,"All-Silicon Omnidirectional Mirrors Based on One-Dimensional Photonic Crystals", Appl. Phys. Lett. vol. 82, No. 19, May 12, 2003.
Chigrin, D.N., "Observation of Total Omnidirectional Reflection From a One-Dimensional Dielectric Lattice", Appl. Phys. A. 68, 25-28 (1999).
Park, Y., "GaAs—based Near-infrared Omnidirectional Reflector," Appl. Phys. Lett., vol. 82, No. 17, Apr. 28, 2003.
H-Y Lee, "Design and Evaluation of Omnidirectional One-Dimensional Photonic Crystals", Journal of Appl. Phys., vol. 93, No. 2, Jan. 15, 2003.
Banerjee, Debasish, "Narrow-band Omnidirectional Structural Color", SAE World Congress 01-1049 (2008).
U.S. Appl. No. 12/686,861, filed Jan. 13, 2010 entitled "Multilayer Photonic Structures".
U.S. Appl. No. 12/853,801, filed Aug. 10, 2010 entitled "Methods for Identifying Articles of Manufacture".
Office Action mailed Jul. 20, 2011 as it relates to U.S. Appl. No. 12/389,221.
Office Action mailed Dec. 27, 2011 as it relates to U.S. Appl. No. 12/389,221.
Office Action mailed Oct. 20, 2011 as it relates to U.S. Appl. No. 12/853,801.
Office Action mailed Sep. 22, 2011 as it relates to U.S. Appl. No. 12/853,718.
Office Action mailed Apr. 26, 2012 as it relates to U.S. Appl. No. 12/389,221.
Notice of Allowance mailed Feb. 16, 2012 as it relates to U.S. Appl. No. 12/853,718.
Office Action mailed Apr. 11, 2012 as it relates to U.S. Appl. No. 12/389,256.
Office Action mailed Mar. 28, 2012 as it relates to U.S. Appl. No. 12/853,801.
Notice of Allowance mailed May 29, 2012 as it relates to U.S. Appl. No. 12/853,801.
Office Action mailed on Nov. 22, 2013 in U.S. Appl. No. 12/389,221.
Rejection dated Dec. 5, 2012, including portions translated to English, filed in Chinese Application No. 201080007817.1.
Rejection dated Mar. 5, 2013, including portions translated to English, filed in Japanese Application No. 2011-173986.
Office Action dated Oct. 17, 2012, filed in U.S. Appl. No. 12/686,861.
Notice of Allowance dated Oct. 17, 2013, filed in U.S. Appl. No. 12/686,861.
Office Action dated Jun. 16, 2014 in Japanese Application No. 2011-224277.
Office Action dated Apr. 12, 2016 in Japanese Application No. 2011-224277.

* cited by examiner

SEMI-TRANSPARENT REFLECTORS

CROSS-REFERENCE TO RELATED APPLICATIONS

The present specification is related to U.S. patent application Ser. No. 12/389,256, titled "Methods for Producing Omni-Directional Multi-Layer Photonic Structures," filed on Feb. 19, 2009, U.S. patent application Ser. No. 12/686,861, titled "Multilayer Photonic Structures," filed on Jan. 13, 2010, U.S. patent application Ser. No. 12/853,718, titled "Optical Lock Systems and Methods," filed on Aug. 10, 2010, and U.S. patent application Ser. No. 12/853,801, titled "Methods for Identifying Articles of Manufacture," filed on Aug. 10, 2010, which are incorporated by reference herein in their entirety.

TECHNICAL FIELD

The present specification generally relates to semi-transparent reflectors and, more specifically, to semi-transparent reflectors comprising multilayer photonic structures.

BACKGROUND

Reflectors are commonly utilized to reflect electromagnetic waves at certain frequency bands such as visible light. A mirror that reflects visible light may be constructed on a planar glass substrate having a reflective metal-coating, which commonly includes silver or aluminum. Similarly, half-silvered mirrors, which transmit a portion of incident visible light such as 50% and reflect the remainder at a single specified angle of incidence such as 45°, may also be constructed with such reflective metal-coatings. Such mirrors and half-silvered mirrors comprise conductive materials and may operate as a source of unwanted electromagnetic interference in the non-visible spectrums such as, for example, the radio frequency spectrum.

Accordingly, non-metal semi-transparent reflectors may be desirable and alternative semi-transparent reflectors comprising multilayer photonic structures are needed.

SUMMARY

In one embodiment, a semi-transparent reflector may include a multilayered photonic structure. The multilayered photonic structure includes a plurality of coating layers of high index dielectric material and a plurality of coating layers of low index dielectric material. The plurality of coating layers of high index dielectric material and the plurality of coating layers of low index dielectric material of the multilayered photonic structure are arranged in an [LH . . . (LH)$^N$ . . . L] structure. L is one of the plurality of coating layers of low index dielectric material. H is one of the plurality of coating layers of high index dielectric material. N is a positive integer. The multilayered photonic structure may have substantially constant reflectance values for wavelengths of electromagnetic radiation in a visible spectrum over a range of angles of incidence of the electromagnetic radiation.

In another embodiment, a vehicle may include a communication system and a non-metallic vehicle component. The communication system may receive or transmit a transmission signal. The non-metallic vehicle component may include a multilayered photonic structure. The multilayered photonic structure includes a plurality of coating layers of high index dielectric material and a plurality of coating layers of low index dielectric material. The plurality of coating layers of high index dielectric material and the plurality of coating layers of low index dielectric material of the multilayered photonic structure are arranged in an [LH . . . (LH)$^N$ . . . L] structure. L is one of the plurality of coating layers of low index dielectric material. H is one of the plurality of coating layers of high index dielectric material. N is a positive integer. The multilayered photonic structure may have substantially constant reflectance values for wavelengths of electromagnetic radiation in a visible spectrum over a range of angles of incidence of the electromagnetic radiation from about 0° to about 45°. The multilayered photonic structure can be substantially transparent to the transmission signal.

In yet another embodiment, a non-metallic vehicle component may include a multilayered photonic structure including a plurality of coating layers of high index dielectric material and a plurality of coating layers of low index dielectric material alternately arranged. The multilayered photonic structure may have substantially constant reflectance values for wavelengths of electromagnetic radiation in a visible spectrum from about 400 nm to about 800 nm over a range of angles of incidence of the electromagnetic radiation from about 0° to about 45°. An average of the substantially constant reflectance values may be greater than a target reflectance value minus two standard deviations of the substantially constant reflectance values. The average of the substantially constant reflectance values may be greater than the target reflectance value minus the two standard deviations of the substantially constant reflectance values. A standard deviation of the substantially constant reflectance values may be less than about 3% reflectance. The target reflectance value may be from about 51% to about 95%.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
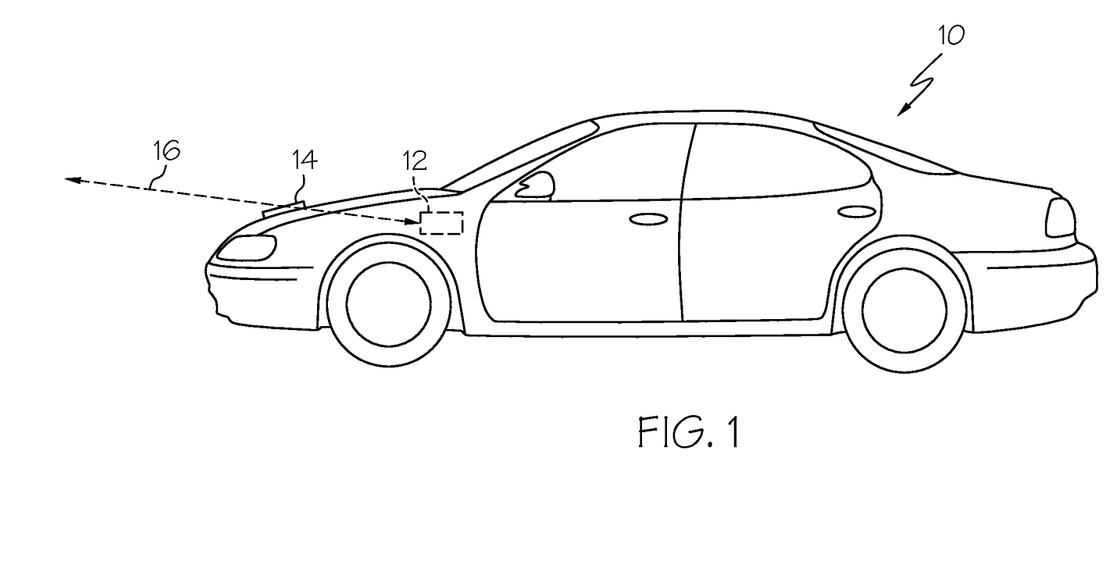
FIG. 1 schematically depicts a vehicle according to one or more embodiments shown and described herein.

FIG. 1 generally depicts one embodiment of a vehicle with a non-metallic vehicle component comprising a multilayer photonic structure. The vehicle generally comprises a communication system for receiving and transmitting a transmission signal, and a non-metallic vehicle component comprising a multilayered photonic structure. Various embodiments of the vehicle and semi-transparent reflectors comprising multilayered photonic structures will be described in more detail herein.

The term "light" as used herein refers to various wavelengths of the electromagnetic spectrum, particularly wavelengths in the ultraviolet (UV), infrared (IR), and visible portions of the electromagnetic spectrum.

The term "transparent" means a material that transmits substantially all of the electromagnetic radiation incident upon the material.

Referring now to FIG. 1, a vehicle 10 is schematically depicted. As will be described in more detail herein, embodiments of the vehicle 10 comprise a communication system 12 and a non-metallic vehicle component 14 comprising a multilayer photonic structure. Although an automobile is depicted in FIG. 1, it is noted that the vehicle 10 may be any vehicle including, without limitation, wheeled vehicles, vehicles with airfoils, tracked vehicles, vessels for transport on water or the like, such as, for example, a car, a truck, a motorcycle, a airplane, a helicopter, a tank, or a ship.

In one embodiment, the vehicle 10 generally comprises a communication system 12 that receives or transmits a transmission signal. Specifically, the communication system 12 may be coupled to the vehicle such that the non-metallic vehicle component 14 is along a transmission path 16 of the transmission signal. The transmission signals may be transmitted at a variety of frequencies (e.g., 24 GHz electromagnetic radiation or 77 GHz electromagnetic radiation). The communication system utilizes the transmission signal to exchange information between the vehicle 10 and a compatible communication device outside of the vehicle 10 such as, for example, another vehicle, a satellite, a communication tower, and the like. The communication system 12 may be a millimeter-wave radar system that transmits and/or receives transmission signals of radio frequency electromagnetic radiation such as, for example, K-band, $K_a$-band, V-band and combinations thereof. While the communication system 12 is depicted in FIG. 1 as exchanging a transmission signal with a compatible communication device outside of the vehicle 10, the compatible communication device may be located within the vehicle 10 such as, for example, a mobile telecommunication device and/or a global positioning system communicating from a vehicle interior.

Still referring to FIG. 1, embodiments of the vehicle 10 comprise a non-metallic vehicle component 14 including a multilayer photonic structure 100. The non-metallic vehicle component 14 may be any device configured to be coupled to a vehicle that reflects or transmits light. For example, the non-metallic vehicle component may have a reflectance profile that approximates the visual appearance of metal. The non-metallic vehicle component may also be a reflector that is semi-transparent.

Figure 2:
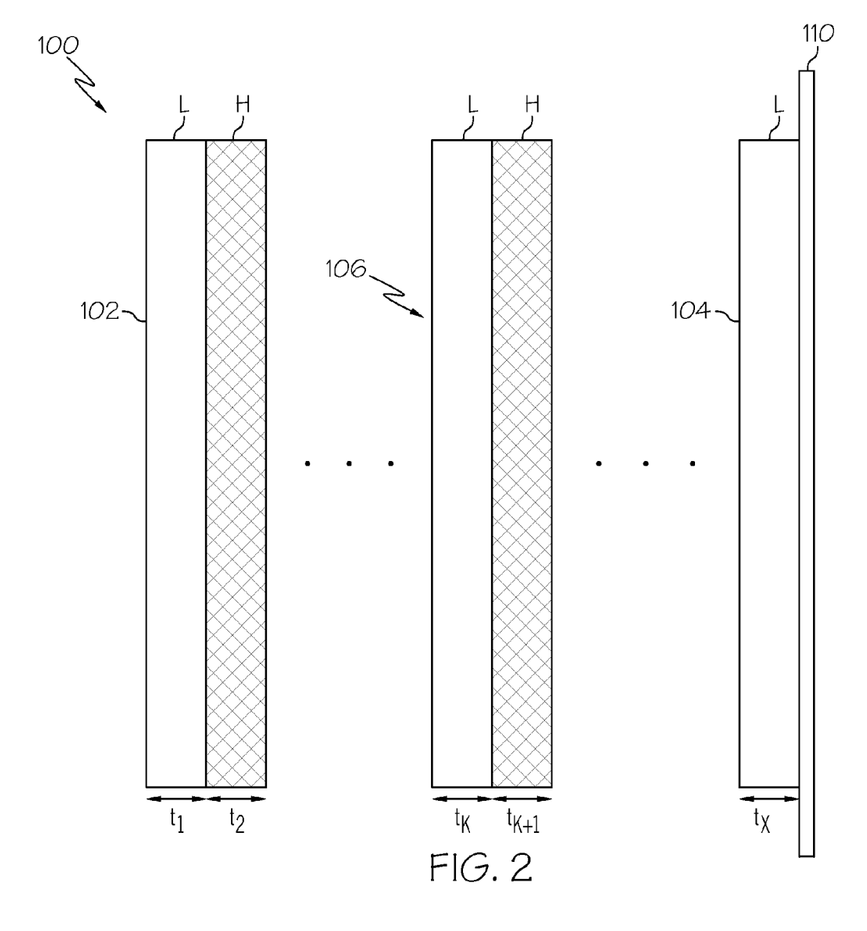
FIG. 2 schematically depicts a multilayer photonic structure according to one or more embodiments shown and described herein.

Referring collectively to FIGS. 1 and 2, the non-metallic vehicle component 14 may be a vehicle emblem. In one embodiment, the vehicle emblem may be manufactured by depositing the multilayer photonic structure 100 on a substrate 110, which may include glass, polymeric materials, ceramic materials, metallic materials, composite materials and/or various combinations thereof. For example, the layers of the multilayer photonic structure 100 may be deposited on a substrate 110 of glass that has a refractive index of about 1.52. Prior to deposition the substrate 110 may be shaped to approximate the final shape of the vehicle emblem. After the multilayer photonic structure 100 has been deposited onto the substrate 110, the vehicle emblem may be finished by manufacturing processes such as, for example, etching, grinding or milling. Once the vehicle emblem has been finished, it may be coupled to a vehicle with an adhesive and/or a mechanical coupling. It is noted that while the non-metallic vehicle component is depicted as a vehicle emblem in FIG. 1, according to the embodiments described herein the non-metallic vehicle component 14 may be an electronic display screen, a window, a windshield, a sun roof, a trim piece, a grille, a hood ornament, a wheel cover, a bumper, a bezel, a light, a taillight, a reflector or a mirror. Additionally, it is noted that the transparency of the multilayer photonic structure 100 may be reduced by utilizing a substrate 110 comprising carbon, silver, chromium, stainless steel, or other absorbing alloys.

As schematically depicted in FIG. 2, the multilayer photonic structures 100 described herein generally comprise a plurality of coating layers of dielectric material with a relatively high refractive index (i.e., high index dielectric material H) and layers of dielectric material with a relatively low refractive index (i.e., low index dielectric material L) alternately arranged. Specifically, the high index dielectric material H has a relatively high refractive index compared to the low index dielectric material L, and the low index dielectric material L has a relatively low refractive index compared to the high index dielectric material H. In one embodiment, the high refractive index is from about 1.9 to about 2.3. In another embodiment, the low refractive index is from about 1.4 to about 1.6.

Figure 3:
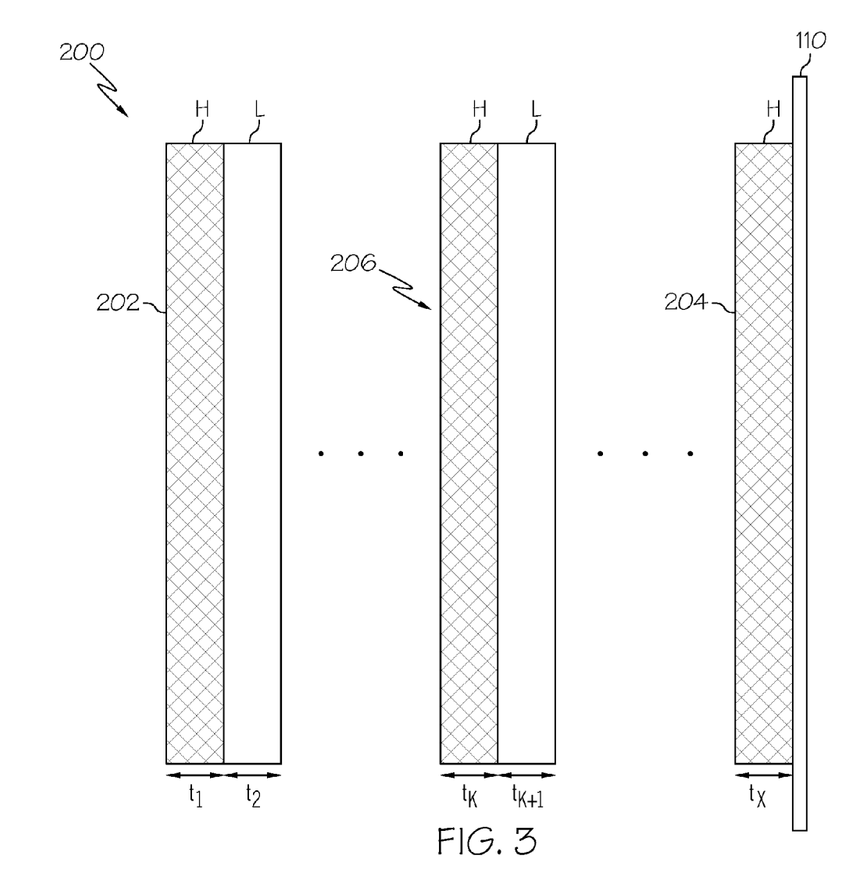
FIG. 3 schematically depicts a multilayer photonic structure according to one or more embodiments shown and described herein.

Referring collectively to FIGS. 2 and 3, high index dielectric material H is generally indicated by an H. While, low index dielectric material L is generally indicated by an L. In one embodiment, as depicted in FIG. 2, the first layer 102 of the multilayer photonic structure 100 is the layer furthest away from the substrate 110 and comprises a low index dielectric material L. The last layer 104 of the multilayer photonic structure 100 is the layer nearest to the substrate 110 and comprises a low index dielectric material L. The ellipses indicate that the intermediate layers 106 of low index dielectric material L and high index dielectric material H may be repeated N times to achieve any total number of layers x. The shorthand notation of [LH . . . (LH)$^N$ . . . L] is used herein to refer to a multilayer photonic structure 100 having the layer structure depicted in FIG. 2, where N is a positive integer and N=(x−3)/2.

In another embodiment, as depicted in FIG. 3, the first layer 202 of the multilayer photonic structure 200 is the layer furthest away from the substrate 210 and comprises a high index dielectric material H. The last layer 204 of the multilayer photonic structure 200 is the layer nearest to the substrate 110 and comprises a high index dielectric material H. The ellipses indicate that the intermediate layers 206 of high index dielectric material H and low index dielectric material L may be repeated N times to achieve any total number of layers x. The shorthand notation of [HL . . .

$(HL)^N \ldots H]$ is used herein to refer to a multilayer photonic structure 200 having the layer structure depicted in FIG. 3, where N is a positive integer and N=(x−3)/2.

Referring again to FIGS. 2 and 3, the total number of layers x may be any odd number that can be produced by a layer synthesis process such as, for example, about 21, from about 17 to about 25, from about 9 to about 39, from about 5 to about 99, or from about 3 to an odd number in the hundreds. The thickness of each layer is generally indicated in FIGS. 2 and 3 by $t_j$ where subscript j ranges from 1 to x and is indicative of an individual layer having its own distinct thickness. The thicknesses of intermediate layers are indicated by $t_k$ and $t_{k+1}$, where k ranges from 3 to x−2.

Figure 4:
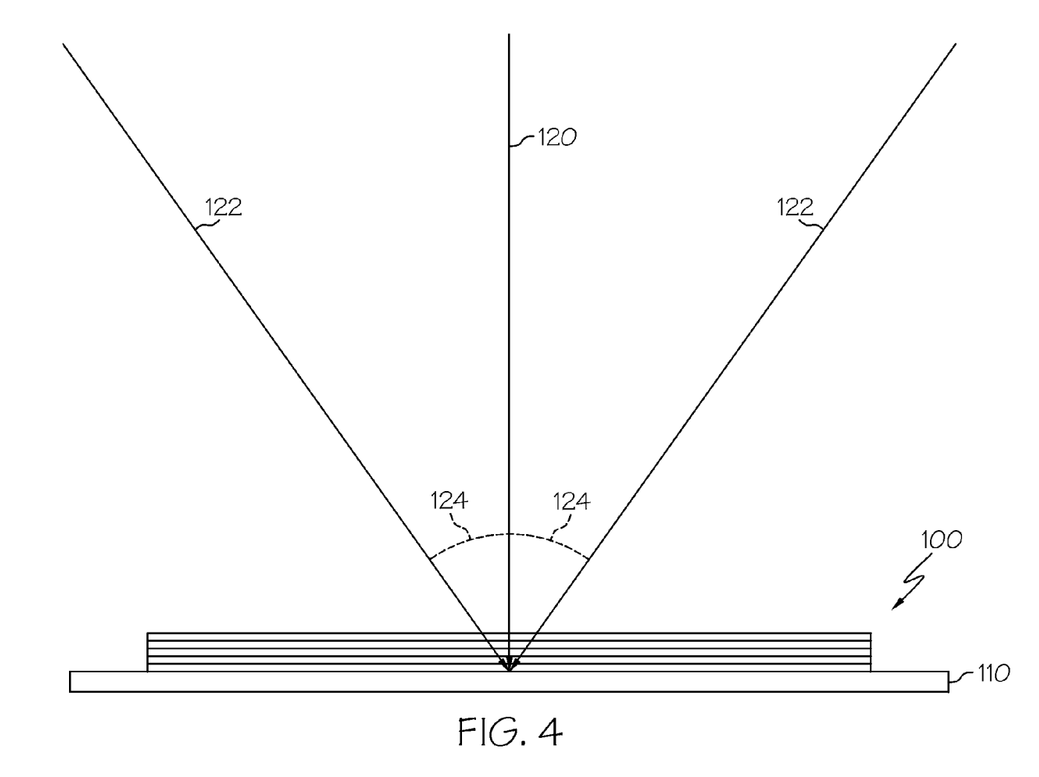
FIG. 4 schematically depicts angles of incidence of electromagnetic radiation upon a multilayer photonic structure according to one or more embodiments shown and described herein.

Referring now to FIG. 4, angles of incidence of the electromagnetic radiation are schematically depicted. A 0° incidence angle corresponds to the normal viewing path 120 where the electromagnetic energy is directed towards the multilayer photonic structure 100 and the substrate 110. A 45° incidence angle corresponds to oblique viewing paths 122 that have an angular offset 124 from the normal viewing path of about 45°. While FIG. 4 depicts only a normal viewing path 120 and oblique viewing paths 122, it is noted that the embodiments described herein additionally relate to any possible viewing path between the oblique viewing paths 122.

Referring again to FIGS. 2 and 3, Embodiments of the multilayer photonic structure 100, 200 may be tuned to produce substantially constant reflectance values for wavelengths of electromagnetic radiation in the visible spectrum (i.e., wavelengths from about 400 nm to about 900 nm or from about 400 nm to about 800 nm) over a range of angles of incidence of the electromagnetic radiation, i.e. the substantially constant reflectance values are about equal to a target reflectance. The target reflectance value may be any reflectance within a range from about A to about B, where A is any value from about 51% to about 94%, B is any value from about 52% to about 95%, and A<B.

Specifically, the multilayer photonic structure 100, 200 may be tuned by adjusting the thickness $t_1, t_2, \ldots, t_k, t_{k+1}, \ldots, t_x$ of each of the layers and or the total number of layers x. The thickness may be any value such as, for example, from about 0.05 nm to about 500 nm. In one embodiment, a transfer matrix method is employed to solve a system of equations that model the substantially constant reflectance values of a multilayer photonic structure 100, 200. The substantially constant reflectance values are dependent upon: the angle of light incident on the structure (e.g., the angle of incidence), the degree of light polarization, the wavelength(s) of interest, the thicknesses $t_j$ of each layer of the multilayer photonic structure 100, 200 and the indices of refraction of the high and low index dielectric materials, the transmission medium, and the incidence medium. The transfer matrix method may be implemented with a computer comprising software programmed to receive various inputs from a user related to the properties of a particular multilayer photonic structure 100, 200 and determine the substantially constant reflectance values. Such software may be referred to herein as a photonics calculator.

The thickness $t_1, t_2, \ldots, t_k, t_{k+1}, \ldots, t_x$ of each of the layers may be determined by comparing the substantially constant reflectance values calculated by the photonics calculator with the target reflectance value. Specifically, an optimization or curve fitting process may operate in conjunction with the photonics calculator. In one embodiment, the sum of the squared difference between each of the substantially constant reflectance values calculated by the photonics calculator and the target reflectance value are minimized. The least squares fitting may be performed by an optimizer implemented with computer software executed on a computer system. While particular methods of modeling and optimizing a multilayer photonic structure 100, 200 are described herein, it should be understood that the embodiments described herein may be modeled and optimized by any method capable of tuning a multilayer photonic structure 100, 200 to produce a target reflectance value.

The multilayer photonic structure 100, 200 may also be tuned by selecting the appropriate high index dielectric material H and low index dielectric material L. In one embodiment, the values for the low refractive index and the high refractive index are selected such that the values are the same as commonly available materials. For example, the low refractive index may be selected to be 1.46 while the high refractive index may be selected to be 2.29 such that the values for the low refractive index and the high refractive index approximate the indices of refraction for silica ($SiO_2$, index of refraction 1.46) and titania ($TiO_2$, index of refraction 2.36), respectively. Accordingly, a multilayer photonic structure design which utilizes 1.46 and 2.29 for the low refractive index and the high refractive index, respectively, may be constructed from silica and titania or other materials having the same or similar indices of refraction. It should be understood that other values for the low refractive index and the high refractive index may be selected which correspond to the indices of refraction of other materials. Materials such as, for example, $Al_2O_3$ and $XF_y$ (where X may be any of Ba, Ca, La, Ce, Mg, and Al and y can be any integer from 1 through 3) may be utilized as high index dielectric material. Materials such as, for example, ZnS, ZnO, $ZrO_2$, $CeO_2$, $Nb_2O_5$, $Ta_2O_5$, $HfO_2$, and $Nd_2O_3$ may be utilized as low index dielectric material. Table 1, shown below, contains a non-exclusive list of further possible materials and their corresponding indices of refraction which may be utilized in the multilayer photonic structures described herein.

TABLE 1

| Material | Index of Refraction (visible spectrum) |
| --- | --- |
| Germanium (Ge) | 4.0-5.0 |
| Tellurium (Te) | 4.6 |
| Gallium Antimonite (GaSb) | 4.5-5.0 |
| Indium Arsenide (InAs) | 4.0 |
| Silicon (Si) | 3.7 |
| Indium Phosphate (InP) | 3.5 |
| Gallium Arsenate (GaAs) | 3.53 |
| Gallium Phosphate (GaP) | 3.31 |
| Vanadium (V) | 3 |
| Arsenic Selenide ($As_2Se_3$) | 2.8 |
| $CuAlSe_2$ | 2.75 |
| Zinc Selenide (ZnSe) | 2.5-2.6 |
| Titanium Dioxide ($TiO_2$) - solgel | 2.36 |
| Alumina Oxide (Al2O3) | 1.75 |
| Yttrium Oxide (Y2O3) | 1.75 |
| Polystyrene | 1.6 |
| Magnesium Fluoride (MgF2) | 1.37 |
| Lead Fluoride (PbF2) | 1.6 |
| Potassium Fluoride (KF) | 1.5 |
| Polyethylene (PE) | 1.5 |
| Barium Fluoride (BaF2) | 1.5 |
| Silica (SiO2) | 1.5 |
| PMMA | 1.5 |
| Aluminum Arsenate (AlAs) | 1.56 |
| Solgel Silica (SiO2) | 1.47 |
| N,N'bis(1naphthyl)-4,4'Diamine (NPB) | 1.7 |
| Polyamide-imide (PEI) | 1.6 |
| Fluorcarbon (FEP) | 1.34 |
| Chlorotrifluoro-Ethylene (CTFE) | 1.42 |
| Cellulose Acetate Butyrate | 1.46-1.49 |
| Methylpentene Polymer | 1.485 |

TABLE 1-continued

| Material | Index of Refraction (visible spectrum) |
|---|---|
| Acetal Homopolymer | 1.48 |
| Cellulose Nitrate | 1.49-1.51 |
| Polyallomer | 1.492 |
| Ionomers | 1.51 |
| Nylons (PA) Type II | 1.52 |
| Polyethylene (Medium Density) | 1.52 |
| PVC (Rigid) | 1.52-1.55 |
| Urea Formaldehyde | 1.54-1.58 |
| Styrene Acrylonitrile Copolymer | 1.56-1.57 |
| Polycarbornate (Unfilled) | 1.586 |
| Polysulfone | 1.633 |
| Chromium (Cr) | 3.0 |
| Tin Sulfide (SnS) | 2.6 |
| Low Porous Si | 2.56 |
| Chalcogenide glass | 2.6 |
| Cerium Oxide (CeO$_2$) | 2.53 |
| Tungsten (W) | 2.5 |
| Gallium Nitride (GaN) | 2.5 |
| Manganese (Mn) | 2.5 |
| Niobium Oxie (Nb$_2$O$_3$) | 2.4 |
| Zinc Telluride (ZnTe) | 3.0 |
| Chalcogenide glass + Ag | 3.0 |
| Zinc Sulfate (ZnSe) | 2.5-3.0 |
| Titanium Dioxide (TiO$_2$) - vacuum deposited | 2.43 |
| Sodium Aluminum Fluoride (Na3AlF6) | 1.6 |
| Polyether Sulfone (PES) | 1.55 |
| High Porous Si | 1.5 |
| Indium Tin Oxide nanorods (ITO) | 1.46 |
| Lithium Fluoride (LiF4) | 1.45 |
| Calcium Fluoride | 1.43 |
| Strontium Fluoride (SrF2) | 1.43 |
| Lithium Fluoride (LiF) | 1.39 |
| PKFE | 1.6 |
| Sodium Fluoride (NaF) | 1.3 |
| Nano-porous Silica (SiO2) | 1.23 |
| Sputtered Silica (SiO2) | 1.47 |
| Vacuum Deposited Silica (SiO2) | 1.46 |
| Hafnium Oxide | 1.9-2.0 |
| Polytetrafluro-Ethylene (TFE) | 1.35 |
| Cellulose Propionate | 1.46 |
| Cellulose Acetate | 1.46-1.50 |
| Ethyl Cellulose | 1.47 |
| Acrylics | 1.49 |
| Polypropylene (Unmodified) | 1.49 |
| Polybutylene | 1.50 |
| Polyethylene (Low Density) | 1.51 |
| Acrylics Multipolymer | 1.52 |
| Styrene Butadiene Thermoplastic | 1.52-1.55 |
| Nylons (Polyamide) Type 6/6 | 1.53 |
| Polyethylene (High Density) | 1.54 |
| Polystyrene (Heat & Chemical) | 1.57-1.60 |
| Polystyrene (General Purpose) | 1.59 |

According to the embodiments described herein, the substantially constant reflectance values are about equal to the target reflectance value when the average of the substantially constant reflectance values is within a few standard deviations of the target reflectance value. The average of the substantially constant reflectance values is given by $$\mu = \frac{1}{N}\sum_{i=1}^{N} r_i, \tag{1}$$

where N is the number of substantially constant reflectance values and r is an individual substantially constant reflectance value. The standard deviation of the substantially constant reflectance values is given by $$\sigma = \sqrt{\frac{1}{N}\sum_{i=1}^{N}(r_i - \mu)^2}, \tag{2}$$

where N is the number of substantially constant reflectance values, r is an individual substantially constant reflectance value, and $\mu$ is the average of the substantially constant reflectance values. The substantially constant reflectance values are about equal to the target reflectance value when $$t-(h \times \sigma) \leq \mu \leq t+(h \times \sigma) \tag{3},$$

where t is the target reflectance value, h is equal to any value from about 0 to about 3, $\sigma$ is the standard deviation of the substantially constant reflectance values and $\mu$ is the average of the substantially constant reflectance values.

In order to provide further clarity without limiting the scope of the embodiments described herein, the following experimental results are provided.

Analytical simulations were conducted with the photonics calculator. The following conditions were set in each of the simulations: an angle of incidence was set to 0° or 45°, the degree of light polarization was set to natural light (i.e., about 0.5 where 0 represents TE light and 1 represents TM light), the transmission medium was set to air (index of refraction of 1.0), the wavelengths of interest were set to 400 nm to 800 nm, and the target reflectance value was set to about 90%. Referring to FIGS. 2 and 3 collectively, for each of the simulations, the high index dielectric material H was set to titania, the low index dielectric material L was set to silica, and the substrate 110 was set to glass (index of refraction of 1.52).

Tables 2 and 3 summarize the results of the photonics calculator, where the total number of layers x and the shorthand notation of the structure are indicated in the leftmost column. Table 2, shown below, contains a summary of the averages of the substantially constant reflectance values determined analytically by the photonics calculator. Table 3, shown below, contains a summary of the standard deviations of the substantially constant reflectance values determined analytically from the photonics calculator.

TABLE 2

| | Average (0°) (400-900 nm) | Average (45°) (400-900 nm) | Average (0°) (400-800 nm) | Average (45°) (400-800 nm) |
|---|---|---|---|---|
| 11 total layers [HL ... (HL)$^N$ ... H] | 71.3 | 67.9 | 71.1 | 68.7 |
| 13 total layers [HL ... (HL)$^N$ ... H] | 78.3 | 73.4 | 78.2 | 75.9 |
| 15 total layers [HL ... (HL)$^N$ ... H] | 81.4 | 77.3 | 82.2 | 78.7 |
| 17 total layers [HL ... (HL)$^N$ ... H] | 79.2 | 75.4 | 79.8 | 76.8 |

TABLE 2-continued

| | Average (0°) (400-900 nm) | Average (45°) (400-900 nm) | Average (0°) (400-800 nm) | Average (45°) (400-800 nm) |
|---|---|---|---|---|
| 19 total layers [HL ... (HL)$^N$ ... H] | 87.2 | 76.7 | 87.6 | 84.3 |
| 21 total layers [HL ... (HL)$^N$ ... H] | 85.9 | 81.4 | 86.1 | 82.4 |
| 23 total layers [HL ... (HL)$^N$ ... H] | 86.9 | 82.9 | 87.6 | 83.6 |
| 25 total layers [HL ... (HL)$^N$ ... H] | 88.8 | 85.0 | 88.2 | 86.2 |
| 19 total layers [HL ... (HL)$^N$ ... H] | 87.2 | 76.7 | 87.6 | 84.3 |
| 21 total layers [HL ... (HL)$^N$ ... H] | 89.2 | 78.4 | 89.3 | 86.1 |
| 23 total layers [HL ... (HL)$^N$ ... H] | 86.6 | 79.2 | 86.7 | 83.1 |
| 21 total layers [LH ... (LH)$^N$ ... L] | 88.0 | 82.1 | 88.3 | 85.0 |

TABLE 3

| | Std Dev (0°) (400-900 nm) | Std Dev (45°) (400-900 nm) | Std Dev (0°) (400-800 nm) | Std Dev (45°) (400-800 nm) |
|---|---|---|---|---|
| 11 total layers [HL ... (HL)$^N$ ... H] | 11.9 | 10.5 | 13.1 | 11.1 |
| 13 total layers [HL ... (HL)$^N$ ... H] | 6.1 | 7.0 | 6.6 | 4.8 |
| 15 total layers [HL ... (HL)$^N$ ... H] | 6.7 | 7.1 | 7.0 | 5.8 |
| 17 total layers [HL ... (HL)$^N$ ... H] | 7.8 | 7.4 | 8.5 | 7.7 |
| 19 total layers [HL ... (HL)$^N$ ... H] | 5.4 | 19.2 | 5.9 | 5.4 |
| 21 total layers [HL ... (HL)$^N$ ... H] | 5.0 | 5.2 | 5.5 | 4.4 |
| 23 total layers [HL ... (HL)$^N$ ... H] | 5.4 | 5.0 | 5.8 | 5.2 |
| 25 total layers [HL ... (HL)$^N$ ... H] | 7.5 | 8.2 | 6.9 | 7.1 |
| 19 total layers [HL ... (HL)$^N$ ... H] | 5.4 | 19.2 | 5.9 | 5.4 |
| 21 total layers [HL ... (HL)$^N$ ... H] | 2.9 | 18.6 | 2.8 | 2.8 |
| 23 total layers [HL ... (HL)$^N$ ... H] | 4.3 | 10.8 | 4.7 | 4.5 |
| 21 total layers [LH ... (LH)$^N$ ... L] | 3.3 | 8.3 | 3.6 | 3.2 |

According to Table 2, the average of the substantially constant reflectance values ranged from about 67.9 to about 89.3 for all angles of incidence and both wavelength bandwidths. The average of the substantially constant reflectance values ranged from about 71.3 to about 89.2 for an angle of incidence of 0° and for wavelengths from about 400 nm to about 900 nm. The average of the substantially constant reflectance values ranged from about 67.9 to about 85.0 for an angle of incidence of 45° and for wavelengths from about 400 nm to about 900 nm. The average of the substantially constant reflectance values ranged from about 71.1 to about 89.3 for an angle of incidence of 0° and for wavelengths from about 400 nm to about 800 nm. The average of the substantially constant reflectance values ranged from about 68.7 to about 86.2 for an angle of incidence of 45° and for wavelengths from about 400 nm to about 800 nm.

According to Table 3, the standard deviation of the substantially constant reflectance values ranged from about 2.8 to about 19.2 for all angles of incidence and both wavelength bandwidths. Overall, most of the standard deviations of the substantially constant reflectance values were less than about 7% reflectance (e.g., less than about 6% reflectance, less than about 5% reflectance, less than about 4% reflectance, or less than about 3% reflectance). The standard deviation of the substantially constant reflectance values ranged from about 2.9 to about 11.9 for an angle of incidence of 0° and for wavelengths from about 400 nm to about 900 nm. The standard deviation of the substantially constant reflectance values ranged from about 5.0 to about 19.2 for an angle of incidence of 45° and for wavelengths from about 400 nm to about 900 nm. The standard deviation of the substantially constant reflectance values ranged from about 2.8 to about 13.1 for an angle of incidence of 0° and for wavelengths from about 400 nm to about 800 nm. The standard deviation of the substantially constant reflectance values ranged from about 2.8 to about 11.1 for an angle of incidence of 45° and for wavelengths from about 400 nm to about 800 nm.

Referring collectively to Tables 2 and 3, the average of the substantially constant reflectance values were generally within three standard deviations (i.e., h≤3, according to equation 3) of the target reflectance value of 90%. Most of the simulations resulted in an average of the substantially constant reflectance values within two standard deviations (i.e., h≤2). Some of the simulations resulted in an average of the substantially constant reflectance within fewer than two standard deviations (e.g., h≤1.5, h≤1, or h≤0.5).

Figure 5:
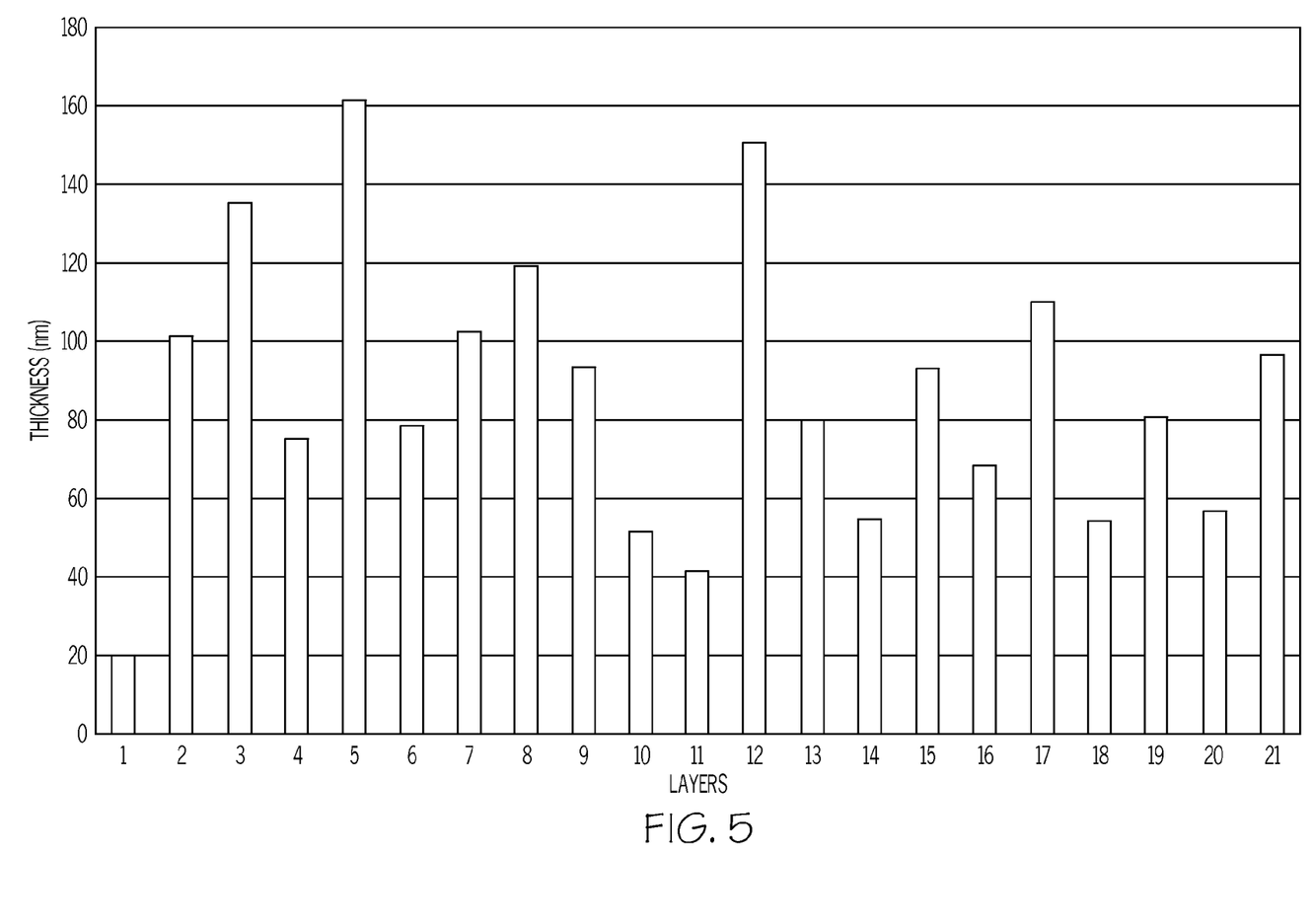
FIG. 5 graphically depicts a multilayer photonic structure according to one or more embodiments shown and described herein.

Referring now to FIG. 5, the thicknesses of each of the layers, which were determined by the photonics calculator, of one embodiment of a twenty-one layer photonic structure are graphically depicted. The layer numbers, for j=1→21, are plotted along the abscissa. The thicknesses $t_j$ are plotted along the ordinate. The twenty-one layer photonic structure comprised an [LH . . . (LH)$^N$ . . . L] arrangement (i.e., x=21 and N=9). The thicknesses $t_j$ ranged from about 20 nm to about 160 nm.

Figure 6:
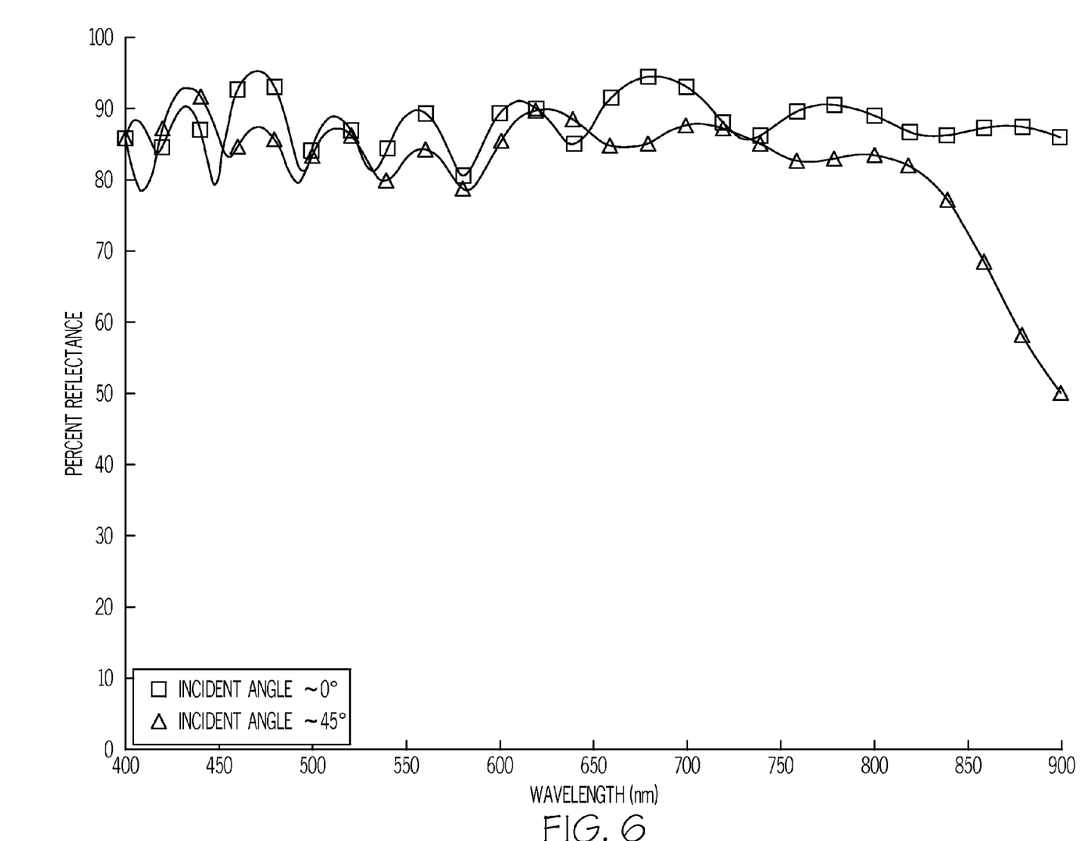
FIG. 6 graphically depicts a reflectance profile of a semi-transparent reflector according to one or more embodiments shown and described herein.

The substantially constant reflectance values of the twenty-one layer [LH . . . (LH)$^N$ . . . L] photonic structure of FIG. 5 are graphically depicted in FIG. 6. The average and standard deviation of the substantially constant reflectance values were about 88.3 and 3.6, respectively, for an angle of incidence of 0° (indicated by squares in FIG. 6) and for wavelengths from about 400 nm to about 800 nm. The average and standard deviation of the substantially constant reflectance values were about 85.0 and 3.2, respectively, for an angle of incidence of 45° (indicated by triangles in FIG. 6) and for wavelengths from about 400 nm to about 800 nm.

Figure 7:
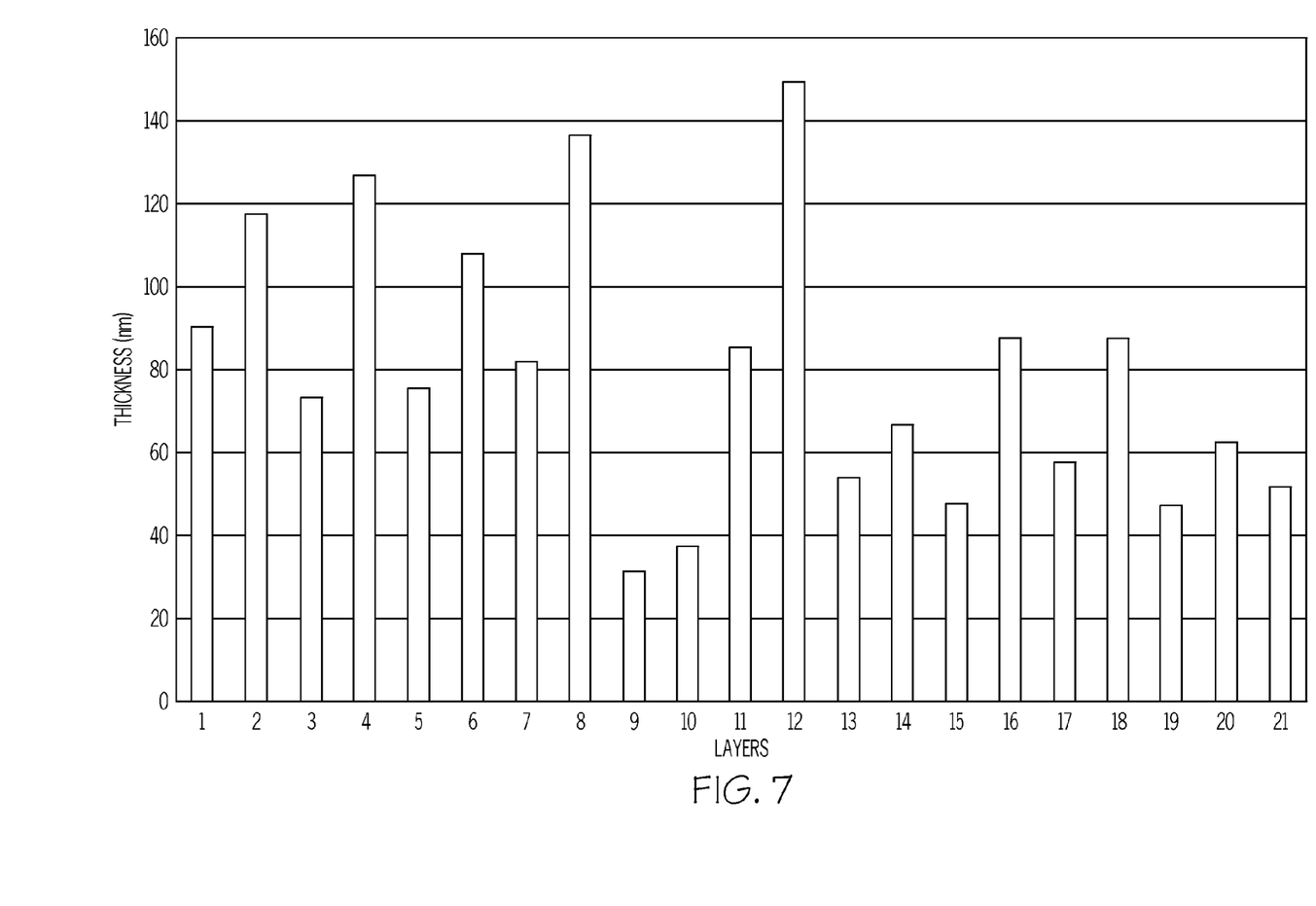
FIG. 7 graphically depicts a multilayer photonic structure according to one or more embodiments shown and described herein.

Referring now to FIG. 7, the thicknesses of each of the layers, which were determined by the photonics calculator, of another embodiment of a twenty-one layer photonic structure are graphically depicted. The layer numbers, for j=1→21, are plotted along the abscissa. The thicknesses $t_j$ are plotted along the ordinate. The twenty-one layer photonic structure comprised an [HL . . . (HL)$^N$ . . . H] arrangement (i.e., x=21 and N=9). The thicknesses $t_j$ ranged from about 30 nm to about 150 nm.

Figure 8:
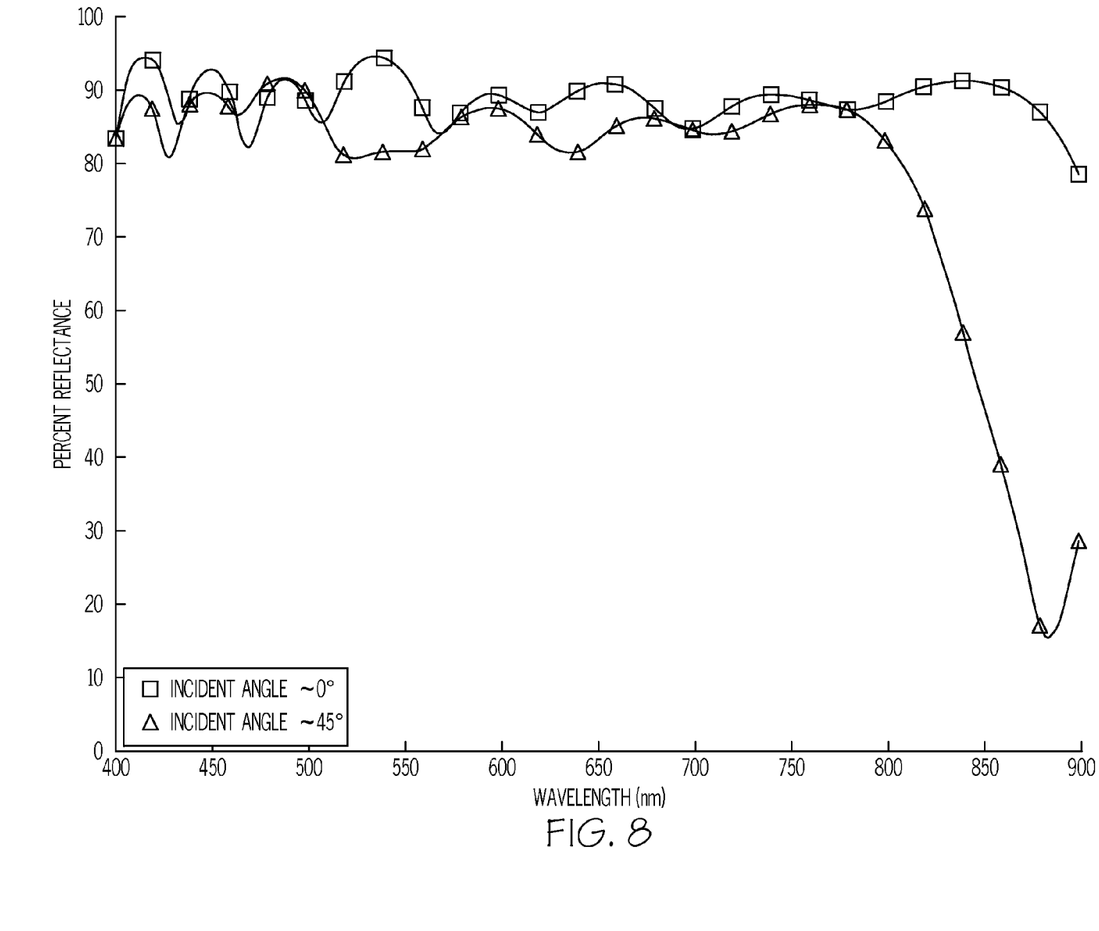
FIG. 8 graphically depicts a reflectance profile of a semi-transparent reflector according to one or more embodiments shown and described herein.

The substantially constant reflectance values of the twenty-one layer photonic structure of FIG. 7 are graphically depicted in FIG. 8. The average and standard deviation of the substantially constant reflectance values were about 89.3 and 2.8, respectively, for an angle of incidence of 0° (indicated by squares in FIG. 8) and for wavelengths from about 400 nm to about 800 nm. The average and standard deviation of the substantially constant reflectance values were about 86.1 and 2.8, respectively, for an angle of incidence of 45° (indicated by triangles in FIG. 8) and for wavelengths from about 400 nm to about 800 nm.

It should now be understood that the multilayered photonic structures described herein may be utilized as semi-transparent components and/or coatings that are commonly made of conductive materials. For example, one embodiment of the multilayered photonic structure may be applied to a glass substrate, such as a window or a mirror. When applied to a window, the multilayered photonic structure may reflect light according to a target reflectance value that can be set to any desired value. Thus, a window comprising a multilayered photonic structure, as is described herein, may provide increased levels of privacy through increased target reflectance values. Additionally, since embodiments of the multilayered photonic structure are transparent to radio frequency electromagnetic radiation, such windows may provide an increased level of privacy without interfering with transmission signals.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A semi-transparent reflector comprising a multilayered photonic structure, the multilayered photonic structure comprising a plurality of coating layers of high index dielectric material and a plurality of coating layers of low index dielectric material, wherein:

the plurality of coating layers of high index dielectric material and the plurality of coating layers of low index dielectric material of the multilayered photonic structure are arranged in an [LH . . . (LH)$^N$ . . . L] structure having a total number of layers x, wherein:

L is one of the plurality of coating layers of low index dielectric material;

H is one of the plurality of coating layers of high index dielectric material;

N is a positive integer;

the total number of layers x is from about 5 to about 99;

intermediate layers (LH) are repeated N times to achieve the total number of layers x such that N=(x−3)/2; and the multilayered photonic structure has substantially constant reflectance values for wavelengths of electromagnetic radiation in a visible spectrum over a range of angles of incidence of the electromagnetic radiation as measured by having a standard deviation of the substantially constant reflectance values of less than about 7% reflectance over a range of angles of incidence from about 0° to about 45° over a range of wavelengths of electromagnetic radiation from about 400 nm to about 900 nm.

2. The semi-transparent reflector of claim 1, wherein an average of the substantially constant reflectance values is greater than a target reflectance value minus two standard deviations of the substantially constant reflectance values and the average of the substantially constant reflectance values is less than the target reflectance value plus the two standard deviations of the substantially constant reflectance values.

3. The semi-transparent reflector of claim 2, wherein the target reflectance value is from about 51% to about 95%.

4. The semi-transparent reflector of claim 1, wherein the plurality of coating layers of low index dielectric material comprise a low refractive index from about 1.4 to about 1.6.

5. The semi-transparent reflector of claim 1, wherein the plurality of coating layers of high index dielectric material comprise a high refractive index from about 1.9 to about 2.3.

6. The semi-transparent reflector of claim 1, wherein:
the plurality of coating layers of high index dielectric material consists of 8 to 12 coating layers of high index dielectric material; and
the plurality of coating layers of low index dielectric material consists of 9 to 13 coating layers of low index dielectric material.

7. The semi-transparent reflector of claim 1, wherein each of the plurality of coating layers of high index dielectric material and each of the plurality of coating layers of low index dielectric material have a layer thickness from about 0.05 nm to about 500 nm.

8. The semi-transparent reflector of claim 1, wherein the multilayered photonic structure is coupled to a surface of an electronic display, a window or a vehicle.

9. A non-metallic vehicle component comprising a multilayered photonic structure comprising a plurality of coating layers of high index dielectric material and a plurality of coating layers of low index dielectric material alternately arranged, wherein:
the multilayered photonic structure has substantially constant reflectance values for wavelengths of electromagnetic radiation in a visible spectrum over a range of angles of incidence of the electromagnetic radiation as measured by having a standard deviation of the substantially constant reflectance values of less than about 7% reflectance over a range of angles of incidence of the electromagnetic radiation from about 0° to about 45° over a range of wavelengths of electromagnetic radiation from about 400 nm to about 900 nm;
an average of the substantially constant reflectance values is greater than a target reflectance value minus two standard deviations of the substantially constant reflectance values;
the average of the substantially constant reflectance values is less than the target reflectance value plus the two standard deviations of the substantially constant reflectance values;
the target reflectance value is from about 51% to about 95%; and
a total number of coating layers is from about 5 to about 99.

10. The non-metallic vehicle component of claim 9, wherein:
the plurality of coating layers of high index dielectric material and the plurality of coating layers of low index dielectric material of the multilayered photonic structure are arranged in an [LH . . . (LH)$^N$ . . . L] structure having a total number of layers x;
L is one of the plurality of coating layers of low index dielectric material;
H is one of the plurality of coating layers of high index dielectric material;
N is a positive integer; and
intermediate layers (LH) are repeated N times to achieve the total number of layers x such that N=(x−3)/2.

11. The non-metallic vehicle component of claim 9, wherein:
the plurality of coating layers of high index dielectric material and the plurality of coating layers of low index dielectric material of the multilayered photonic structure are arranged in an [HL . . . (HL)$^N$ . . . H] structure having a total number of layers x;
L is one of the plurality of coating layers of low index dielectric material;
H is one of the plurality of coating layers of high index dielectric material;
N is a positive integer; and
intermediate layers (HL) are repeated N times to achieve the total number of layers x such that N=(x−3)/2.

12. A vehicle comprising:
a communication system coupled to the vehicle that receives or transmits a transmission signal, wherein the communication system utilizes the transmission signal to exchange information between the vehicle and a compatible communication device outside of the vehicle; and
a non-metallic vehicle component coupled to the vehicle and disposed within a transmission path of the communication system, the non-metallic vehicle component comprising a multilayered photonic structure, the multilayered photonic structure comprising a plurality of coating layers of high index dielectric material and a plurality of coating layers of low index dielectric material, wherein:
the plurality of coating layers of high index dielectric material and the plurality of coating layers of low index dielectric material of the multilayered photonic structure are arranged in an [LH . . . (LH)$^N$ . . . L] structure having a total number layers x, wherein:
L is one of the plurality of coating layers of low index dielectric material;
H is one of the plurality of coating layers of high index dielectric material;
N is a positive integer;
intermediate layers (LH) are repeated N times to achieve the total number of layers x such that N=(x−3)/2;
the multilayered photonic structure has substantially constant reflectance values for wavelengths of electromagnetic radiation in a visible spectrum over a range of angles of incidence of the electromagnetic radiation as measured by having a standard deviation of the substantially constant reflectance values of less than about 7% reflectance over a range of angles of incidence from about 0° to about 45° over a range of wavelengths of electromagnetic radiation from about 400 nm to about 900 nm; and
the multilayered photonic structure is substantially transparent to the transmission signal, and
wherein a total number of layers x is from about 5 to about 99.

13. The vehicle of claim 12, wherein:
an average of the substantially constant reflectance values is greater than a target reflectance value minus two standard deviations of the substantially constant reflectance values;
the average of the substantially constant reflectance values is less than the target reflectance value plus the two standard deviations of the substantially constant reflectance values; and
the target reflectance value is from about 51% to about 95%.

14. The vehicle of claim 12, wherein the non-metallic vehicle component is a trim piece, a vehicle emblem, a grille, a hood ornament, a wheel cover, a bumper, a bezel, a taillight, a reflector, a video monitor coating, or a mirror.

15. The vehicle of claim 12, wherein the transmission signal is a K-band transmission, a Ka-band transmission or a V-band transmission.

16. The vehicle of claim 12, wherein the non-metallic vehicle component is coupled to an exterior surface of the vehicle.

17. The vehicle of claim 12, wherein:
the plurality of coating layers of high index dielectric material consists of 8 to 12 coating layers of high index dielectric material; and
the plurality of coating layers of low index dielectric material consists of 9 to 13 coating layers of low index dielectric material.

* * * * *